Patented July 1, 1952

2,602,083

UNITED STATES PATENT OFFICE 2,602,083

ALKALI CELLULOSE COMPOSITIONS

Albert B. Savage and Richard W. Swinehart, Midland, Mich., assignors to The Dow Chemical Company, Midland, Mich., a corporation of Delaware No Drawing. Application June 4, 1947, Serial No. 752,571

1 Claim. (Cl. 260—233)

This invention relates to the manufacture of water-soluble methyl cellulose, and is concerned particularly with an improvement in the economy and quality of such manufacture. It relates as well to a new high viscosity methyl cellulose of high solubility in water.

During the past 30 years, methyl cellulose has been developed from a laboratory curiosity to a technically important commercial product. The fact that it may be soluble in cold water, or in dilute alkali (with or without a freezing step), depending on the degree of substitution, is well known. While the alkali-soluble materials, of a relatively low degree of etherification, are important products, the type of methyl cellulose which can be dissolved in water is even more important, and is the one here concerned.

Many suggestions have been made to improve the older processes for making water-soluble methyl cellulose. These have dealt not only with the choice of methylating, i. e. etherifying agent, and the temperature and duration of the etherification reaction, but also with the character of the alkali cellulose to be etherified and the methods whereby the chosen type of alkali cellulose may be made. Many of the processes have differed chiefly in the choice of particular concentrations of alkali and ratios of alkali and of water to the cellulose. Two contributions to this art, in recent years, have been disclosed by Lilienfeld, U. S. 2,103,952 and by Maasberg, U. S. 2,160,782.

The Lilienfeld Patent 2,103,952 discloses the reaction of a methyl halide with an alkali cellulose having an alkali to cellulose ratio of from 0.3 parts to 0.8 parts of alkali per part of cellulose, and a water to cellulose ratio of at least 0.5 parts of water per part of cellulose, the quantity of water being in every case greater than that of alkali, but smaller than 3 times the weight of alkali calculated as sodium hydroxide. The alkali cellulose, then, contains alkali and water in ratios equivalent to sodium hydroxide solutions of from 49 to 26 per cent.

The Maasberg Patent 2,160,782, discloses the reaction of methyl halides or sulfate with an alkali cellulose containing from 0.9 to 1.2 parts of sodium hydroxide and from 0.9 to 1.5 parts of water, per part of cellulose. This alkali cellulose contains alkali and water in ratios equivalent to sodium hydroxide solutions of from about 38 to about 57 per cent. The reaction, when carried out as described, yields a methyl cellulose with a methoxyl content of from 25 to 33 per cent, i. e. from 1.5 to 2 methoxyl groups per $C_6$ unit in the cellulose.

It is well known that sodium hydroxide solutions of high concentration penetrate sheets of cellulose fibers less readily than do more dilute solutions. On the other hand, it is generally believed that the larger amounts of water present in an alkali cellulose made from dilute sodium hydroxide are unduly destructive of the etherifying agent, leading to the formation of unnecessarily large amounts of methyl alcohol and methyl ether as by-products. The more concentrated the alkali solution, however, the greater is the degradation of the cellulose, and the lower is the viscosity of the methyl cellulose obtained by etherification. These and other problems associated with methyl cellulose manufacture give rise to the following objects of the present invention.

It is among the objects of this invention to provide a method for the production of a uniformly substituted, water-soluble methyl cellulose with an improved efficiency in the etherification reaction. Another object is to provide an economical method for the production of a uniform, water-soluble methyl cellulose of high viscosity. A further object is to provide a method whereby a sheet of cellulose fibers may be uniformly impregnated with sodium hydroxide solution, with minimum degradation of the cellulose, to provide an alkali cellulose which yields a water-soluble methyl cellulose upon etherification with a methyl halide or sulfate. A particular object is to provide a method for producing from wood pulp a methyl cellulose having at least as high a viscosity as has been obtained heretofore from cotton fibers, and one which produces from cotton pulp a methyl cellulose of heretofore unobtainably high viscosity. The general object is the provision of a particularly advantageous and economical process for the production of water-soluble methyl cellulose of high quality. Yet another object is the provision of an improved high viscosity methyl cellulose.

The foregoing and related objects have been fulfilled by the present invention, which consists essentially in reacting an alkali cellulose of a particular narrow range of compositions, with a methyl halide or sulfate in amount at least equivalent to the amount of sodium hydroxide present, until the sodium hydroxide is almost fully neutralized, and recovering the methyl cellulose. The crux of the invention resides in the particular composition of the alkali cellulose employed in the otherwise customary type of etherification reaction. The use of that alkali cellulose makes possible the use of smaller charges of etherifying agents, as will be shown hereinafter, and leads to a general economy in reagents and the production of a much improved product of high viscosity.

According to the invention, the alkali cellulose employed is one which contains at least 0.9 and not over 1.2 parts by weight of sodium hydroxide, per part of cellulose, and at least 1.6 and not much over 2.25 parts of water, per part of cellulose, and in which the ratio of alkali to water represents a sodium hydroxide solution of from 32 to 38 per cent concentration. Such an alkali cellulose is prepared, according to the invention, by passing a felted sheet of cellulose fibers, from either cotton or wood, through a bath of aqueous sodium hydroxide of from 32 to 38 per cent concentration, at or slightly above room temperature, to effect a substantially uniform saturation of the sheet with the alkali, and then pressing the sheet, as between suitably spaced rollers, to reduce the content of alkali, and correspondingly that of water, to within the recited limiting ratios to the weight of cellulose. Control of this pressing operation is easily attained by the standard procedure of titrating the alkali in a weighed sample cut from the alkali cellulose sheet, to determine the amount of alkali therein, and then adjusting the roller spacing to allow more alkali to remain therein or to express more of the alkali, as may be required. When the proper roller setting has been attained for a given fibrous sheet, further operations need little or no control to maintain the ratios in the stated range.

When an alkali cellulose as just defined is treated in the usual manner with methyl chloride or sulfate at the usual temperatures of etherification, there is obtained a product which is more uniform and more completely soluble than that obtained under similar reaction conditions when using a lower water or alkali to cellulose ratio in an alkali cellulose prepared either from more dilute or from more concentrated sodium hydroxide solutions. The product has, as well, a much higher viscosity, measured in standard solution in water than methyl cellulose prepared from the same batch of cellulose by any known procedure, and no special cooling of the alkali cellulose sheet, during its manufacture and prior to etherification, is needed to obtain the said high viscosity products. The product, then, may be used without special treatment commonly required to remove incompletely soluble materials, and much smaller amounts of the methyl cellulose are required to provide solutions of any desired viscosity for the various technological applications of methyl cellulose, e. g. when used as a protective colloid, thickener, adhesive or coating material.

The invention may be understood by reference to the following illustrative examples.

*Example 1.—Methyl cellulose from cotton linters*

A sheet of 600 second cotton linters was dipped in a sodium hydroxide solution of 35 per cent concentration and was pressed to provide the indicated ratios of alkali and of water to cellulose. Other conditions of treatment are set forth in the following Table I. The alkali cellulose was heated to 42° C. to 75° C. with the indicated amount of methyl chloride in a closed vessel until the charge contained only the noted small amount of sodium hydroxide. The heating schedule employed in each case was 2 hours at 42° C., 2 hours at 52° C., and then at 75° C. to completion, usually about 5 more hours. In each case, the vessel was cooled to stop the reaction while the mixture was still slightly alkaline. The remaining methyl chloride was accounted for, and the methyl cellulose was analyzed and tested for solubility in water and for viscosity of a standard aqueous solution. For comparison, similar runs were carried out on some of the same batch of cellulose sheet, but using a 50 per cent solution of sodium hydroxide, under one of the heretofore standard procedures. Since the alkali cellulose from 50 per cent sodium hydroxide must be kept as cool as possible before etherification, to minimize degradation of the cellulose, all four of the alkali cellulose samples used in these runs were given identical cooling treatment.

TABLE I

| Run No. | 1 | 2 | 3 | 4 |
|---|---|---|---|---|
| Sodium Hydroxide: | | | | |
| Concentration, per cent | 35 | 35 | 50 | 50 |
| Temperature of bath, °C | 40 | 40 | 70 | 70 |
| Wt. ratio, Sodium Hydroxide/Cellulose | 0.90 | 0.93 | 0.95 | 0.98 |
| Wt. ratio, Water/Cellulose | 1.67 | 1.72 | 0.95 | 0.98 |
| Wt. ratio, Methyl Chloride/Cellulose: | | | | |
| Loaded to Reactor | 1.10 | 1.10 | 1.33 | 1.33 |
| Consumed in Reaction | 1.06 | 1.06 | 1.20 | 1.21 |
| Final Sodium Hydroxide in Reactor, Per cent | 0.4 | 0.1 | 0 | 0.1 |
| Time at Reaction Temperature, Hours | 9.7 | 9 | 9.5 | 9.5 |
| Methyl Cellulose: | | | | |
| Viscosity, centipoises, 2 per cent solution in water | 17,600 | 17,500 | 8,710 | 6,990 |
| Per cent solids, measured on 1 per cent solution in water | Trace | Trace | Trace | 0.05 |
| Methoxyl, per cent | 27.8 | 28.1 | 31.3 | 30.5 |
| Methoxyl, degree of substitution | 1.68 | 1.70 | 1.91 | 1.86 |
| Methoxyl, equivalent methyl chloride | 0.53 | 0.53 | 0.60 | 0.58 |
| Hence, methyl chloride to side reactions | 0.53 | 0.53 | 0.60 | 0.63 |
| Hence, efficiency, based on charge, per cent | 48 | 48 | 45 | 44 |

From the foregoing table it is observed that, under otherwise comparable conditions, the herein claimed ratios of alkali and of water to cellulose, obtained using 35 per cent sodium hydroxide solution, yield a product from these cotton linters of about 17,500 centipoises viscosity while the same cellulose, treated with 50 per cent sodium hydroxide solution, gives a product of from 7,000 to 9,000 centipoises viscosity. Similar runs, made with 35 per cent sodium hydroxide and without any chilling of the alkali cellulose prior to etherification, gave methyl cellulose products whose standard 2 per cent solutions in water had viscosities near 5,000 centipoises. This is over twice the viscosity of a 2 per cent solution in water of any commercial methyl cellulose heretofore available in a water-soluble form. It is noted further that, when 35 per cent sodium hydroxide is used, instead of 50 per cent sodium hydroxide, the charge of methyl chloride per pound of cellulose may be reduced 17 per cent, from 1.33 to 1.10 pounds, and the consumption of methyl chloride is reduced 12 per cent, from 1.2 to 1.06 pounds, per pound of cellulose present.

*Example 2.—Methyl cellulose from wood pulp*

In a manner similar to that described in Example 1, a sheet of a "high viscosity" type of high alpha-cellulose wood pulp fibers was converted to alkali cellulose by immersion in solutions of the concentrations as shown in the following Table II. The alkali and water to cellulose ratios were adjusted by squeezing excess liquor from the alkali cellulose sheet, and etherification was conducted as before. The alkali cellulose in runs 5 and 6 was chilled before etherification, but no cooling was used in runs 7, 8 and 9.

tween the time of its preparation and etherification. A comparison of runs 5 and 7 shows that it is possible to effect a saving, according to the present invention, of 17 per cent in the methyl chloride charged to the reactor, and a further economy of about 13 per cent in the amount of methyl chloride consumed in the reaction.

*Example 3*

A series of reactions was carried out on a number of samples of alkali cellulose all of which had been made from the same high viscosity type of wood pulp sheet used in Example 2, and all of which had been prepared using 35 per cent sodium hydroxide solution. The various samples had been pressed to provide a variety of ratios of alkali and of water to cellulose. The reaction conditions were as previously stated in Example 1, except that the alkali cellulose in run number 12 was chilled as soon as it was made and was kept cold until charged into the etherifying vessel, while none of the other samples were cooled dur-

TABLE II

| Run No. | 5 | 6 | 7 | 8 | 9 |
|---|---|---|---|---|---|
| Sodium Hydroxide: | | | | | |
| Concentration, per cent | 50 | 50 | 35 | 35 | 35 |
| Temperature of bath, °C | 58 | 58 | 40 | 45 | 45 |
| Weight Ratio, Sodium Hydroxide/Cellulose | 1.0 | 0.9 | 0.9 | 1.02 | 1.02 |
| Weight Ratio, Water/Cellulose | 1.0 | 0.9 | 1.67 | 1.89 | 1.89 |
| Weight Ratio, Methyl Chloride/Cellulose: | | | | | |
| Loaded to reactor | 1.33 | 1.33 | 1.10 | 1.15 | 1.25 |
| Consumed in reaction | 1.26 | 1.13 | 1.10 | 1.15 | 1.25 |
| Final Sodium Hydroxide in Reactor, Per Cent | 0.1 | 0.2 | 0.1 | 0.5 | 0.2 |
| Time at Reaction Temperature, Hours | 9 | 8.5 | 10 | 10 | 10 |
| Methyl Cellulose: | | | | | |
| Viscosity, centipoises, 2 per cent solution in water | 1,420 | 910 | 2,510 | 2,680 | 2,320 |
| Per cent solids, measured on 1 per cent solution in water | 0.1 | 0.9 | 0.25 | 0.6 | 0.25 |
| Methoxyl, per cent | 31.3 | 25.9 | 28.3 | 26.8 | 25.9 |
| Methoxyl, degree of substitution | 1.91 | 1.56 | 1.71 | 1.61 | 1.56 |
| Methoxyl, equivalent methyl chloride | 0.60 | 0.49 | 0.54 | 0.51 | 0.49 |
| Hence, methyl chloride to side reactions | 0.66 | 0.64 | 0.56 | 0.64 | 0.76 |
| Hence, efficiency, based on charge, per cent | 45 | 37 | 49 | 44 | 39 |

Again it is seen that an alkali cellulose made from 35 per cent sodium hydroxide solution and ing the corresponding interval before etherification. The results are given in Table III.

TABLE III

| Run No. | 10 | 11 | 12 | 7 | 8 | 9 | 13 |
|---|---|---|---|---|---|---|---|
| Sodium Hydroxide: | | | | | | | |
| Concentration, per cent | 35 | 35 | 35 | 35 | 35 | 35 | 35 |
| Temperature of bath | 42 | 41 | 42 | 40 | 45 | 45 | 46 |
| Weight Ratio Sodium Hydroxide/Cellulose | 0.71 | 0.77 | 0.88 | 0.90 | 1.02 | 1.02 | 1.13 |
| Weight Ratio, Water/Cellulose | 1.32 | 1.43 | 1.63 | 1.67 | 1.89 | 1.89 | 2.10 |
| Weight Ratio, Methyl Chloride/Cellulose: | | | | | | | |
| Loaded to reactor | 1.00 | 1.00 | 1.00 | 1.10 | 1.15 | 1.25 | 1.33 |
| Consumed in reaction | 0.90 | 0.97 | 1.00 | 1.10 | 1.15 | 1.25 | 1.33 |
| Final Sodium Hydroxide in Reactor, Per Cent | 0 | 0.1 | 1.6 | 0.1 | 0.5 | 0.2 | 0.9 |
| Time at Reaction Temperature, Hours | 11 | 11 | 9.5 | 10 | 10 | 10 | 10 |
| Methyl Cellulose: | | | | | | | |
| Viscosity, centipoises, 2 per cent solution in water | 940 | 1,140 | 1,190 | 2,510 | 2,680 | 2,320 | 2,320 |
| Per cent solids, measured on 1 per cent solution in water | 4.5 | 4.0 | 2.1 | 0.25 | 0.60 | 0.25 | 0.25 |
| Methoxyl, per cent | 25.0 | 25.4 | 25.3 | 28.3 | 26.8 | 25.9 | 27.1 |
| Methoxyl, degree of substitution | 1.50 | 1.52 | 1.51 | 1.71 | 1.61 | 1.56 | 1.63 |
| Methoxyl, equivalent methyl chloride | 0.48 | 0.48 | 0.48 | 0.54 | 0.51 | 0.49 | 0.52 |
| Hence, methyl chloride to side reactions | 0.42 | 0.49 | 0.52 | 0.56 | 0.64 | 0.76 | 0.81 |
| Hence, efficiency based on charge, per cent | 54 | 52 | 44 | 49 | 44 | 39 | 39 | having an alkali- and a water-to-cellulose ratio within the herein recited preferred range may be etherified under standard conditions to give a methyl cellulose product having from 1.5 to 3 times as high a viscosity as a methyl cellulose prepared under comparable conditions from an alkali cellulose derived from 50 per cent sodium hydroxide. The unexpectedly high viscosity product is obtained even when the alkali cellulose is uncontrolled as to temperature be- Runs 10–12 show that the methyl cellulose prepared from wood cellulose has very poor solubility if the alkali cellulose used as an intermediate has an alkali to cellulose ratio less than 0.9, and a comparison of runs 9 and 11 shows that this difference in solubility is not due merely to differences in the degree of etherification. Thus, run 11 gave a product having a methoxyl content of 25.4 per cent whose 1 per cent solution in water showed that 4 per cent of the methyl cellulose product was insoluble, while run 9 gave a product having a methoxyl content of 25.9 per cent and only 0.25 per cent insoluble gels. The product from run 12, in which the alkali cellulose had been chilled, had a viscosity of 1190 centipoises, only slightly higher than the product from runs 10 and 11 in which no cooling was applied to the alkali cellulose. Runs 7, 8, 9 and 13 all gave methyl cellulose products having viscosities at least double those from runs 10-12, although all products were made from the same cellulose, using the same concentration of alkali solution, and employing substantially the same etherification conditions. The high viscosity and improved solubility can only be attributed to the selected and narrow range of ratios of alkali and of water to cellulose in the alkali cellulose subjected to etherification.

The herein-described process, then, makes possible an economy in reagents and provides a methyl cellulose from either wood or cotton fibers which has an improved high solubility in water to yield solutions having from 1.5 to 3 or more times as high a viscosity as solutions of like concentration of methyl cellulose prepared by the heretofore known processes from the same cellulose.

The invention has been illustrated by examples in which the etherifying agent employed was methyl chloride. While this is the least expensive methylating agent available at present, the invention is not limited to the use of this agent. Such other methylating agents as methyl bromide or dimethyl sulfate may be used with like advantage, whenever the alkali cellulose contains from 0.9 to 1.2 parts of sodium hydroxide and from 1.6 to 2.25 parts of water per part by weight of cellulose and when these ratios are so interrelated as to represent sodium hydroxide solutions of from 32 to 38 per cent sodium hydroxide concentration, provided that the amount of etherifying agent used is at least equivalent to the amount of sodium hydroxide present and that the etherification reaction is stopped while the reaction mixture is still slightly alkaline but after most of the alkali has been consumed in the reaction.

In the etherification reactions described in the examples, a uniform temperature schedule was employed consisting of 2 hours at 42° C., 2 hours at 52° C., and the balance of the reaction at 75° C. While this is a convenient schedule, and one which can be controlled readily, it is not deemed critical to the success of the reaction, although etherification temperatures over about 75° C. are found undesirable because of excessive formation of methyl alcohol and methyl ether, and temperatures of 100° C. or higher are definitely disadvantageous and must be avoided.

It is recognized that various disclosed processes for making methyl cellulose have been alleged to produce that material in a state which is "perfectly" soluble in cold water. It is not asserted here that the present process makes a product which is more than perfectly soluble. It has been found that, when 100 milliliters of a 1 per cent solution of methyl cellulose in water is centrifuged in a Goetz tube, or similarly graduated apparatus, the products of the present invention deposit from the merest trace up to a few tenths per cent of a watery gel, while methyl cellulose made by the older methods will deposit correspondingly from a trace up to several per cent of such gel. In each case, the methyl cellulose from cotton fibers gives a smaller sediment than that from wood pulp.

We claim:

Alkali cellulose containing at least 0.9 and not over 1.2 parts of sodium hydroxide and at least 1.6 and not substantially over 2.25 parts of water, per part of cellulose, by weight, and in which the ratio of alkali to water represents a sodium hydroxide solution of from 32 to 38 per cent.

ALBERT B. SAVAGE.
RICHARD W. SWINEHART.

REFERENCES CITED

The following references are of record in the file of this patent:

UNITED STATES PATENTS

| Number | Name | Date |
|---|---|---|
| 2,001,102 | Lorand | May 14, 1935 |
| 2,160,782 | Maasberg | May 30, 1939 |
| 2,285,514 | Houghton et al. | June 9, 1942 |

FOREIGN PATENTS

| Number | Country | Date |
|---|---|---|
| 435,346 | Germany | Apr. 29, 1922 |

OTHER REFERENCES

Coward et al., J. Textile Inst. 14, T28, 32 (1923).